(12) United States Patent
Smick

(10) Patent No.: US 11,597,307 B2
(45) Date of Patent: Mar. 7, 2023

(54) VIBRATION DAMPENING SEAT SUSPENSION

(71) Applicant: NEAL SMICK LLC, Yakima, WA (US)

(72) Inventor: D. Neal Smick, Yakima, WA (US)

(73) Assignee: NEAL SMICK LLC, Yakima, WA (US)

( * ) Notice: Subject to any disclaimer, the term of this patent is extended or adjusted under 35 U.S.C. 154(b) by 187 days.

(21) Appl. No.: 17/100,590

(22) Filed: Nov. 20, 2020

(65) Prior Publication Data

US 2021/0155128 A1     May 27, 2021

Related U.S. Application Data

(60) Provisional application No. 62/940,691, filed on Nov. 26, 2019.

(51) Int. Cl.
*B60N 2/54*     (2006.01)
*B60N 2/50*     (2006.01)

(52) U.S. Cl.
CPC .............. *B60N 2/544* (2013.01); *B60N 2/502* (2013.01)

(58) Field of Classification Search
CPC ............ B60N 2/544; B60N 2/502; A47C 7/34
See application file for complete search history.

(56) References Cited

U.S. PATENT DOCUMENTS

| | | | | |
|---|---|---|---|---|
| 1,129,367 A | * | 2/1915 | Smith | B60N 2/502 267/96 |
| 1,706,585 A | * | 3/1929 | Parker | B60N 2/544 267/143 |
| 2,892,482 A | * | 6/1959 | Beoletto | B60N 2/544 297/307 |
| 5,533,784 A | * | 7/1996 | Fukuoka | A47C 3/02 297/311 |

FOREIGN PATENT DOCUMENTS

| | | | | |
|---|---|---|---|---|
| CN | 101641482 A | * | 2/2010 | ............ B60N 2/502 |
| CN | 106882098 A | * | 6/2017 | |

\* cited by examiner

*Primary Examiner* — Milton Nelson, Jr.
(74) *Attorney, Agent, or Firm* — Svendsen Legal, LLC

(57) ABSTRACT

An anti-vibration seat mount for tractors and other rough riding equipment with a paired base and top frame, the base frame separated from the top frame by a tapered spring set, with each spring interconnecting the base frame to the top frame. One tapered spring connects each distal end of the top frame to each distal end of the base frame, with the bottom of each tapered spring is mounted immovably to the base frame. A central pipe from the top frame is received into to the top of each tapered spring, downward through the center of each tapered spring. Vibration and bouncing motions of the work vehicle or tractor onto which the seat suspension is mounted are greatly reduced, with movements absorbed while self-centering back to an original position.

7 Claims, 9 Drawing Sheets

TRAVEL ON CROP LAND WITHOUT A SPRING ISOLATED SEAT

TRAVEL ON CROP LAND WITH A SPRING ISOLATED SEAT

VIBRATION DAMPENING SEAT SUSPENSION

TECHNICAL FIELD

An apparatus and system of a vibration dampening seat suspension, especially useful in a tractor, a truck or a field vehicle, which requires operation on rough or uneven terrain, often with lugged tires or treads. More specifically, the vibration dampening seat suspension includes a set of four concentric springs, positioned between two independent frames, to dampen the vibration to the seat of a driver or a rider of the field vehicle.

BACKGROUND OF THE INVENTION

Work vehicles broadly include tractors, trucks, excavators, combines, and harvesters, and are widely employed in farms, orchards, fields, mines, construction and work-sites to perform needed tasks, often related to the advance preparation, excavating, material removal or dumping, crop planting, crop fertilizing, crop spraying, crop cultivating, crop maintaining, and crop harvesting. Typically, the ground surface of a mine, work-site, farm or orchard is rutted, muddy, or otherwise uneven and bumpy. Additionally, the tires, tracks, or treads of the work vehicle may include deep lugs to provide traction, but add to the vibrations felt by the driver or rider, especially at higher speeds.

Over time, the vibrations and bumps felt and absorbed by the driver or rider of a work vehicle from traveling over the typical uneven surfaces, and especially those vehicles traveling on fields, orchards and crop-lands while equipped with lugged treads and tracks, can cause health issues. These health issues may include both short term and long term dammage to internal organs, the nervous system, and joints. The long term dammage can be painful and irreversible.

A new suspension device, mechanism, or apparatus that serves to dampen or reduce the vibrations felt by the driver and rider of work vehicles would be desirable. The following is a disclosure of preferred embodiments of a vibration dampening seat suspension, especially useful in work vehicles that travel over bumpy ground surfaces, or have lugs and treads that add to the vibrations felt by the driver or rider. The present invention will be understood by reference to the following detailed description taken in conjunction with the accompanying drawings.

Figure 1:
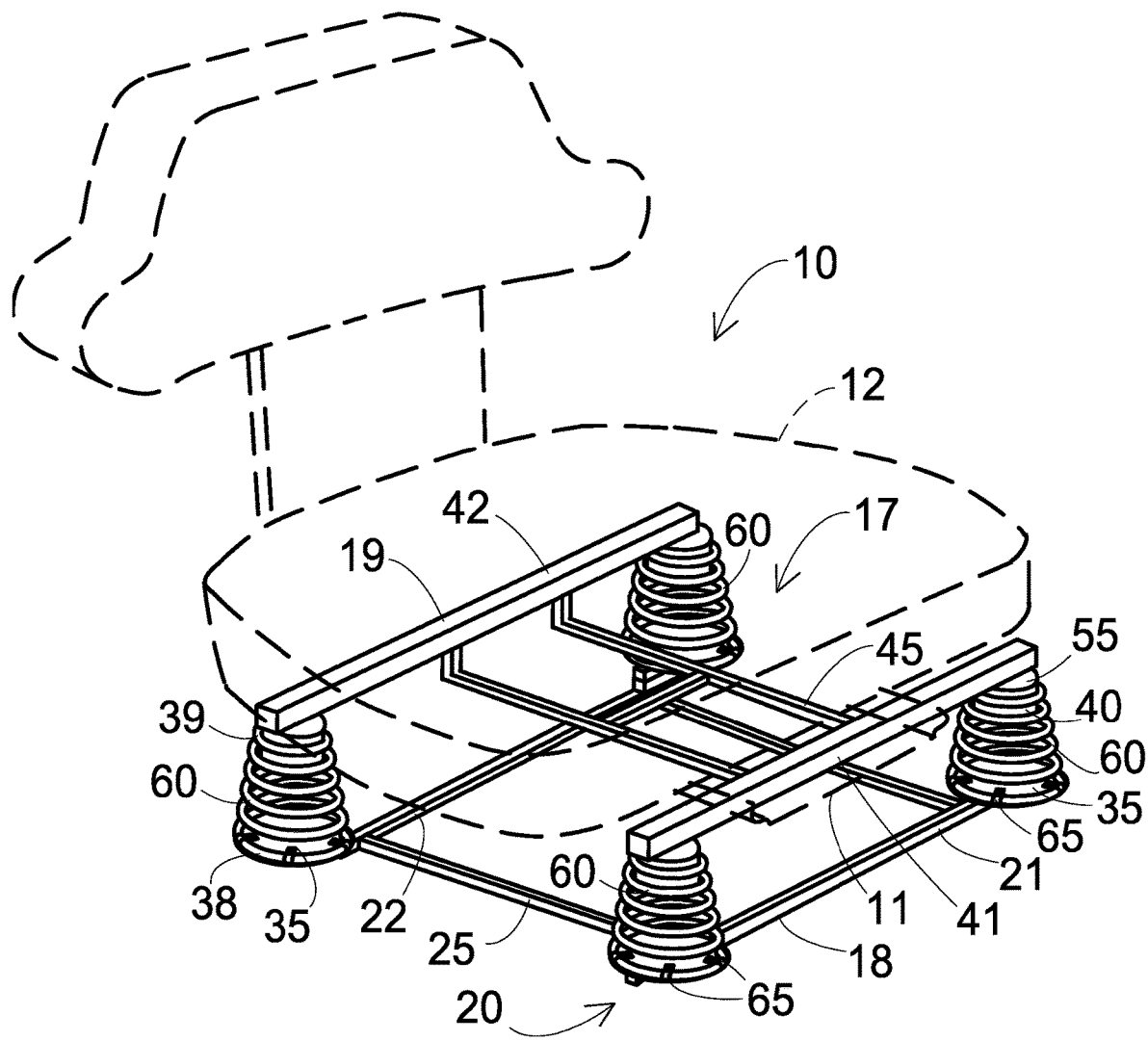
FIG. 1 is a perspective view of a vibration dampening seat suspension, according to an embodiment of the invention.

Reference characters included in the above drawings and graphs indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations, section lines, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

Figure 8:
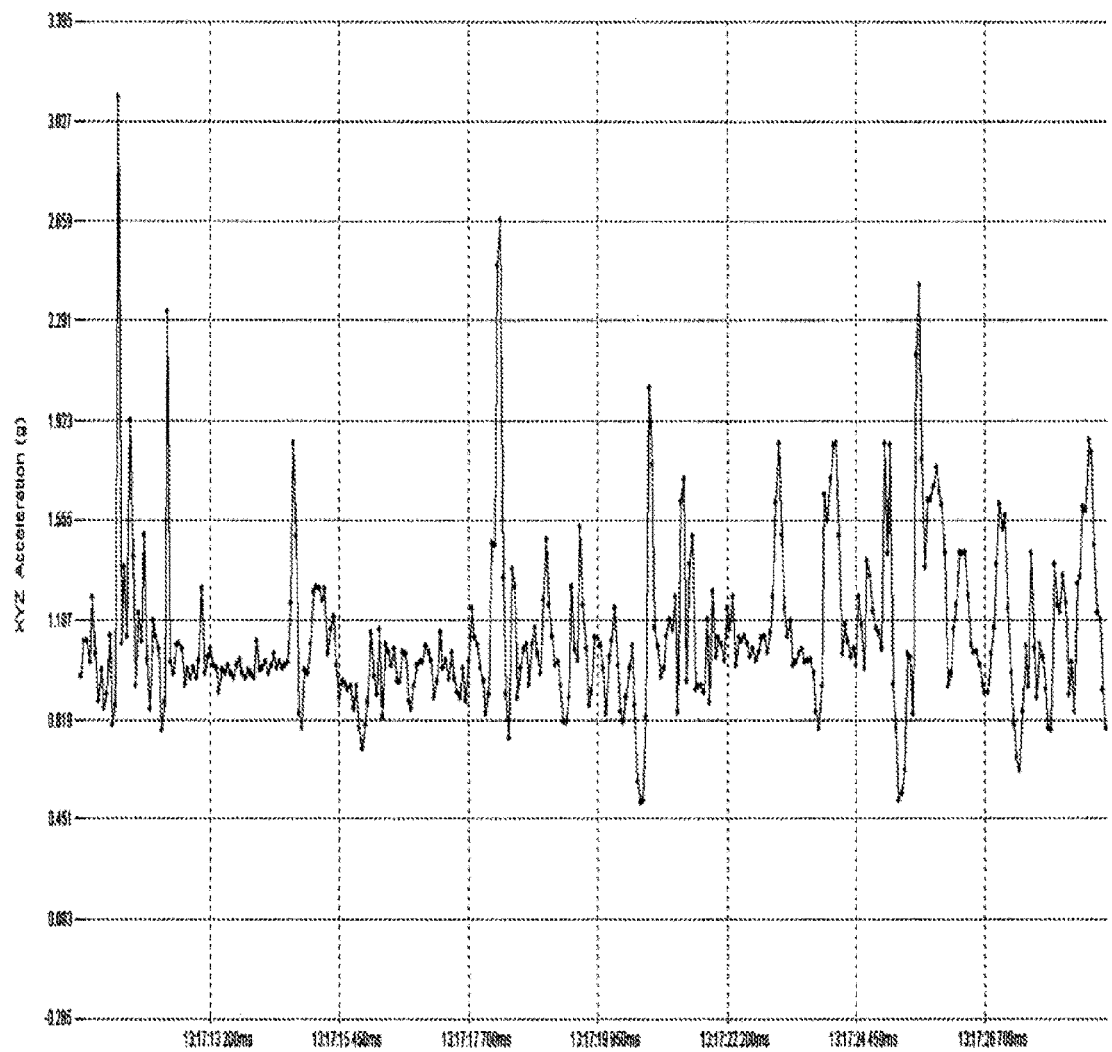
FIG. 8 is a graph titled TRAVEL ON A CROP LAND WITHOUT A SPRING ISOLATED SEAT, showing a seat vibration measured without the vibration dampening seat suspension.
Figure 9:
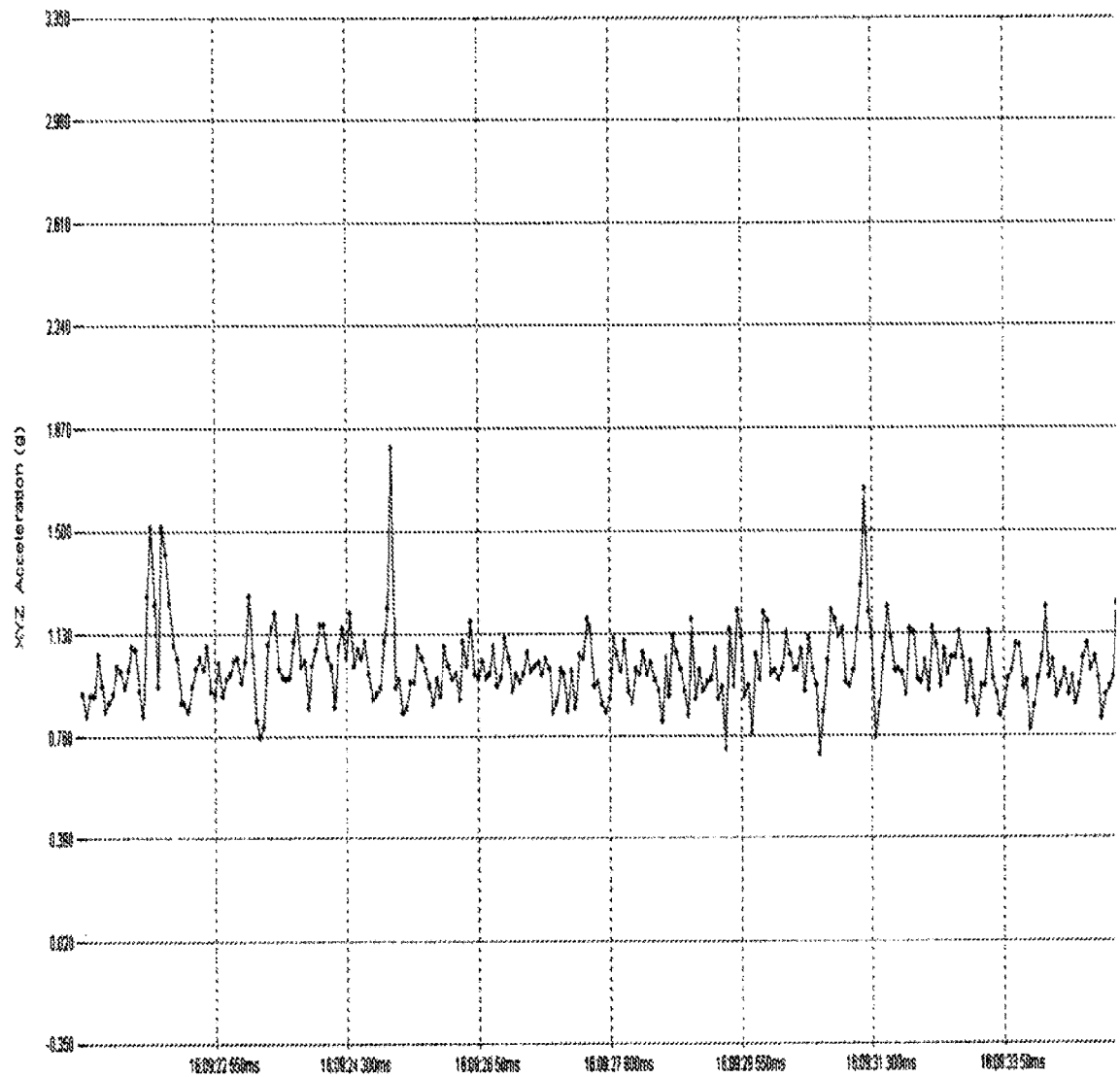
FIG. 9 is a graph titled TRAVEL ON A CROP LAND WITH A SPRING ISOLATED SEAT, showing a seat vibration measured with the vibration dampening seat suspension, according to an embodiment of the invention.

The present invention provides a vibration dampening seat suspension. FIGS. 1 through 7 show a preferred embodiment of the vibration dampening seat suspension 10, which may be referred to herein as "the seat suspension system," or more simply as "the seat suspension." Additionally, FIGS. 8 and 9 show graphically, an operational feature of the seat suspension system. The seat suspension is especially useful when mounted to a seat mount of a work vehicle 11, simply referred to herein as the "seat mount." The seat mount receives a seat 12, which may be any conventional tractor type of seat with the approximate features shown in dashed line in FIG. 1.

A "work vehicle" having the seat mount 11 and employing the seat suspension system 10 of present invention may be, but is not limited to any typical tractor, truck, excavator, combine, or harvester, equipped with conventional wheels, or with continuous track or treads. Work vehicles such as these are widely employed in farms, orchards, vineyards, fields, mines, and construction and work-sites, to perform needed tasks, often related to the advance preparation, excavating, material removal or dumping, crop planting, crop fertilizing, crop spraying, crop cultivating, crop maintaining, and crop harvesting.

Figure 2:
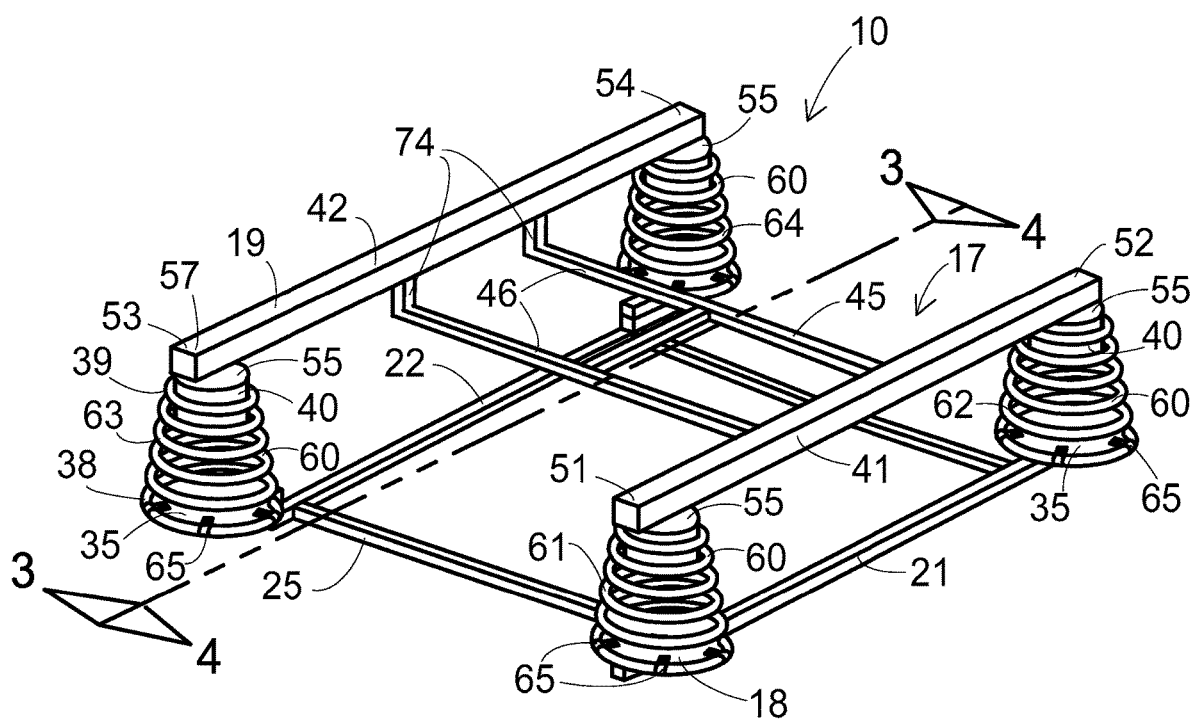
FIG. 2 is a perspective view of a portion of the vibration dampening seat suspension, according to an embodiment of the invention.

A preferred embodiment of the seat suspension 10 of the present invention includes a paired frame 17 with a base frame 18, and a top frame 19. As shown in FIGS. 1 and 2, the base frame is separated from the top frame by a tapered coil spring set 20 that connects the top frame to the bottom frame.

Preferably, the base frame 18 includes a base front bar 21 and a base rear bar 22, as shown in FIG. 1, with the base front bar connected to the base rear bar with a base bar connector 25. Most preferably, as shown in FIG. 2, the base bar connector is a pair of base bar connectors 26, spaced apart from one another to provide strength and rigidity to the base frame, which most preferably has an "H" shape or form.

Most preferably, base front bar 21 and the base rear bar 22 of the base frame 18, and top front bar 41 and the top rear bar 42 of the top frame 19 are all formed from square sectioned tubes, and preferably made of steel, and with approximately a one inch width and most preferably a 0.12 inch wall thickness (or 11 gauge). Most preferably, a high tensile steel alloy is selected for the tubes of the paired frame 17, such as ASTM A513, optionally coated with zinc for additional corrosion protection. In the alternative, the paired frame may be constructed of aluminum, carbon fiber, titanium, or any such material, or tube shape, as selectable by a person skilled in mechanical engineering and design, especially related to vehicle frames and seating.

Figure 3:
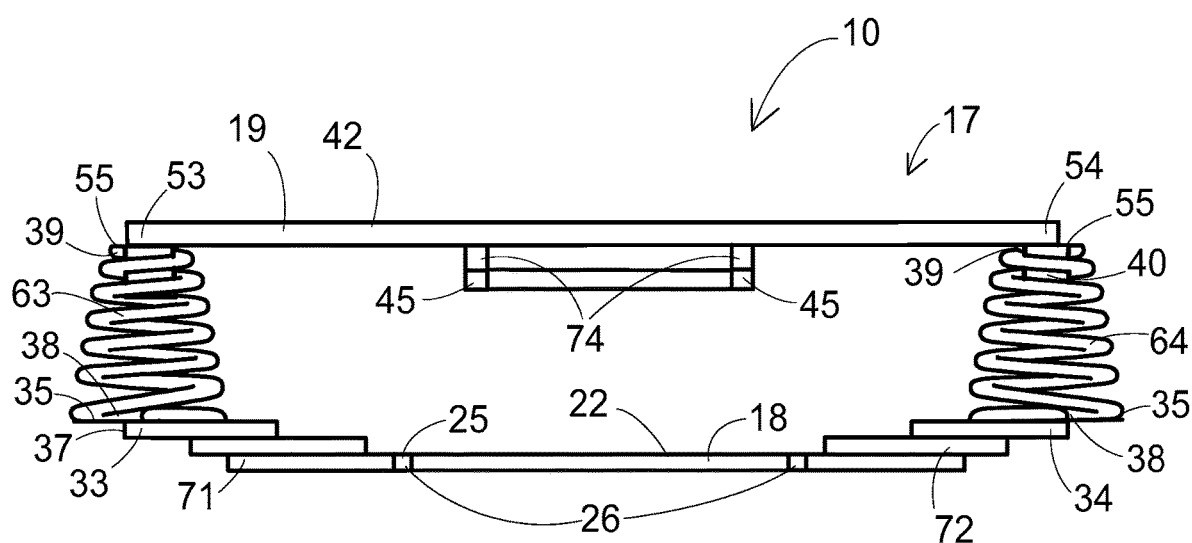
FIG. 3 is a frontward view of a portion of the vibration dampening seat suspension, viewed along section line 3-3 of FIG. 2, according to an embodiment of the invention.
Figure 4:
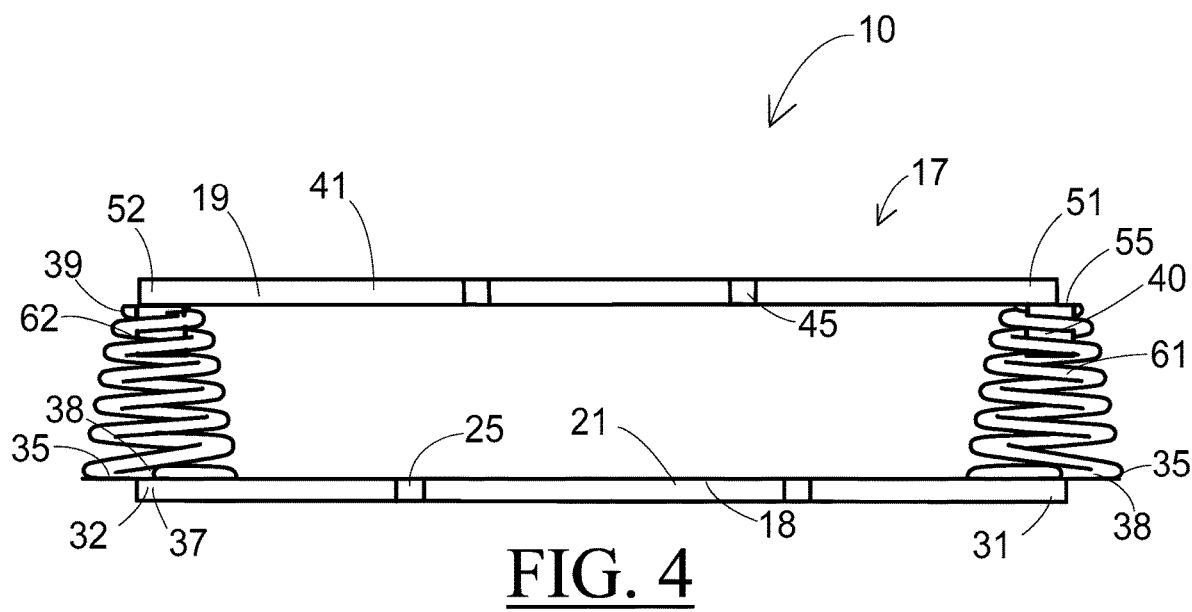
FIG. 4 is a rearward view of a portion of the vibration dampening seat suspension, viewed along section line 4-4 of FIG. 2, according to an embodiment of the invention.
Figure 5:
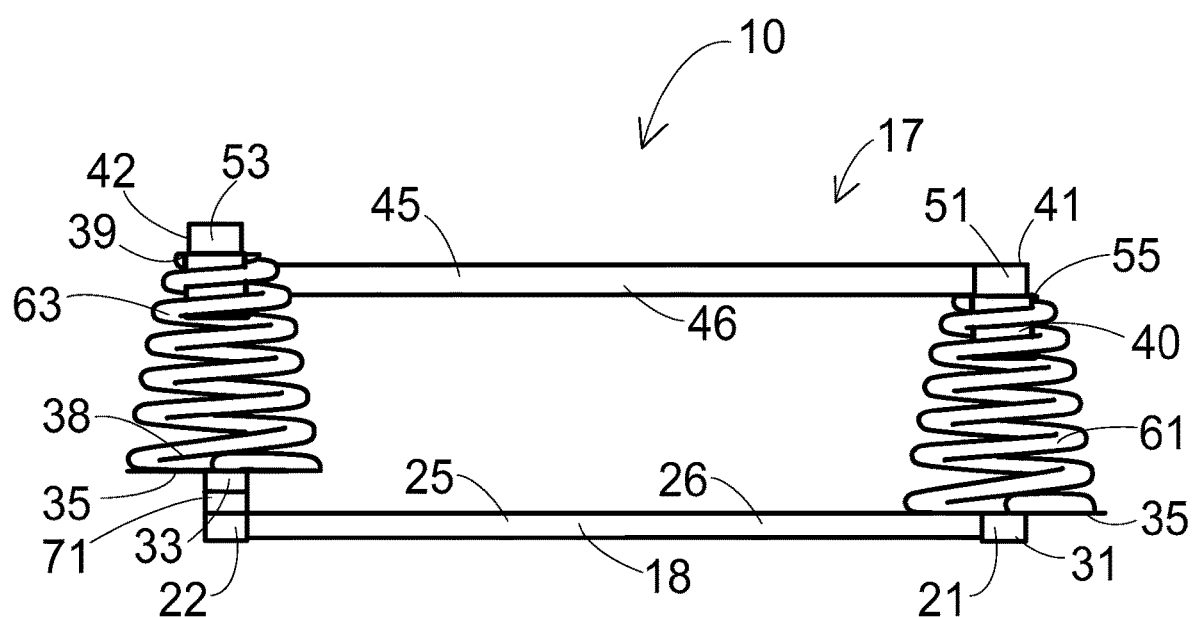
FIG. 5 is a first end view of the vibration dampening seat suspension, according to an embodiment of the invention.
Figure 6:
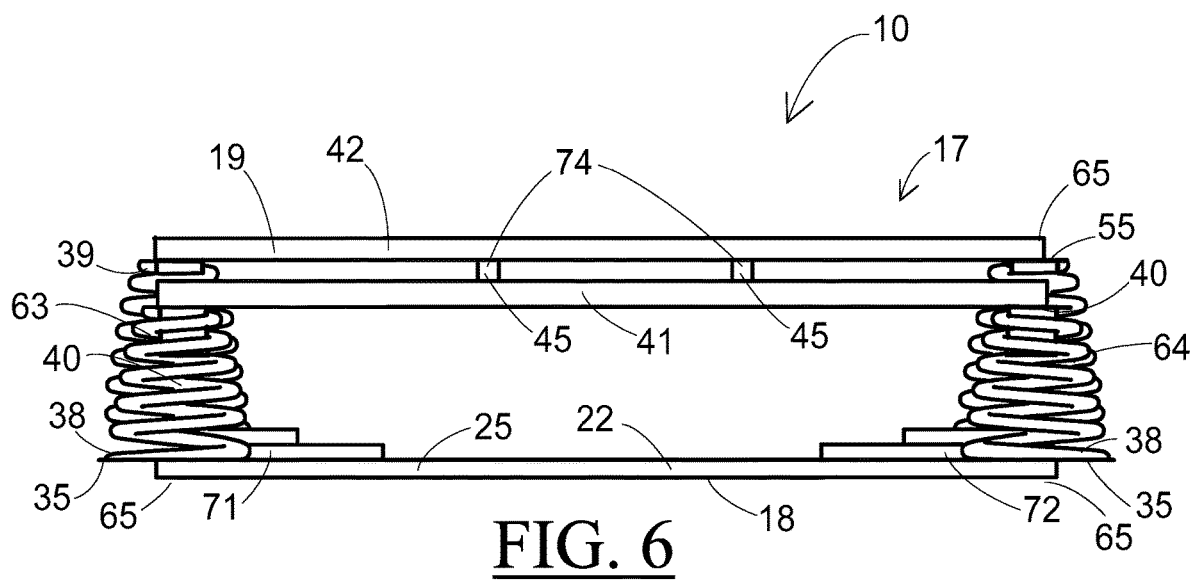
FIG. 6 is a second end view of the vibration dampening seat suspension, according to an embodiment of the invention.
Figure 7:
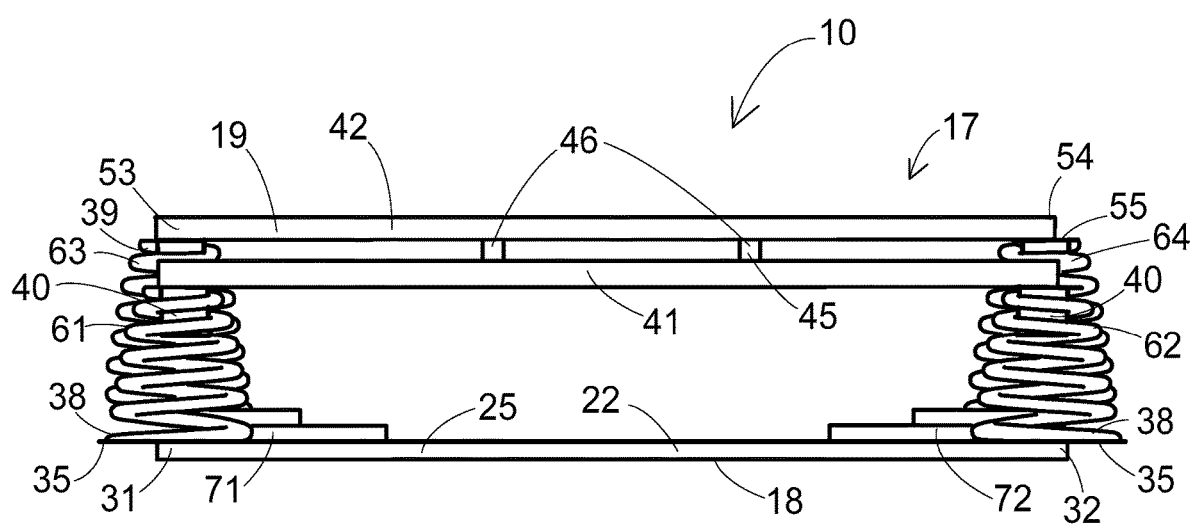
FIG. 7 is a front view of the vibration dampening seat suspension, according to an embodiment of the invention.

Preferably, welded connections form the base frame 18 and the top frame 19, with their preferred "H" shapes, with the pair of base bar connectors 26 connecting the base front bar 21 to the base rear bar 22, and the base bar connectors 46 connecting the top front bar 41 to the top rear bar 42. Additionally, as shown in FIGS. 3 and 4, the base front bar includes a first base front distal end 31 and a second base front distal end 32, and the base rear bar 22 includes a first base rear distal end 33, and a second base rear distal end 34. These four distal ends of the base frame 18 may be referred to as the base distal ends 37. A spring base 35 is mounted proximate to each of the base distal ends of the base frame, with each spring base for receiving one tapered coil spring of the tapered coil spring set 20.

The spring base 35 located at the base distal ends 37, is preferably an approximately five-inch diameter steel circle welded onto the base distal ends, as shown in FIGS. 2, 3, and 4. The circles of the spring base are welded each to the top side of the base front bar 21 and the base rear bars 22. Each spring base receives one spring 60 of the tapered coil spring set 20, with each spring having a preferred height of approximately 5.5 inches, a spring bottom 38 having a diameter of approximately 4.78 inches, a spring top 39 having a diameter of approximately 2.25 inches, and approximately seven coils between the spring bottom and the spring top. A preferably selected spring is manufactured by Century Spring Corp. of Los Angeles, Calif., US, which designates this preferred spring as part number "TA-2401," and is listed as having a calculated average approximate compressive rate of 53.6 pounds per inch.

Preferably, the top frame 19 is similar in construction to the base frame 18, as also shown in FIG. 2, with the top frame including a top front bar 41 and a top rear bar 42, and with the top front bar connected to the top rear bar with a top bar connector 45. Preferably, as shown in FIGS. 2, 3 and 4, the top bar connector is a pair of top bar connectors 46, spaced apart from one another to provide strength and rigidity to the top frame, which most preferably has an "H" shape or form, again similar to the base frame.

Additionally, as shown in FIGS. 3 and 4, the top front bar 41 includes a first top front distal end 51 and a second top front distal end 52, and the top rear bar 42 includes a first top rear distal end 53 and a second top rear distal end 54. These four distal ends of the top frame 19 may be referred to as the top distal ends 57. A spring cap 55 is mounted on each of the distal ends of the top frame 19, with each spring cap for capping one tapered coil spring of the tapered coil spring set 20 in place. Most preferably, each spring cap is a steel washer having an approximately 2.5 inch outer diameter and a 5/16 inch diameter center hole. Preferably, each cap is welded each to the bottom side of the top front bar 21 and the top rear bar 22, as shown in FIG. 2.

From the top frame 19 of the paired frame 17, each spring 60 is held in place on the round plate of the spring cap 39 by a central pipe 40 that is preferably an approximately two-inch outside diameter pipe, and approximately three inches in length, sized to fit within each spring 60 of the tapered coil spring set 20, as shown in FIGS. 1 through 7. The central pipe runs from the top frame at the spring cap located proximate to each of the top distal ends 57, of the top frame, and downward through the center of each spring of the taper coil spring set. Preferably, the central pipe is secured in place at the spring cap by a welded connection, with each central pipe holding each spring in place beneath the top frame. Most preferably the central pipe is a steel pipe having at least an approximately a 1/4 inch wall thickness.

From the base frame 18 of the paired frame 17, each spring 60 is held in place on the round plate of the spring base 35, preferably by a multiple of spring clamps 65 as shown in FIGS. 1 and 2. Each spring clamp is sized to grip each spring 60 of the tapered coil spring set 20, located proximate to the spring base of each spring. Preferably, three spring clamps are employed at each spring, to attached the spring to the spring base. The spring clamps may be screwed to the spring base as preferred, or welded as an alternative, with the spring bottom 38 of each spring held immovably and securely to each spring base at the distal ends of the base frame. Also alternatively, the spring clamp may be any type of welded, screw, or clamp attachment, to hold the spring bottom to the spring base.

An important feature of the seat suspension system 10 is that the seat 12, as used by the operator of the tractor or work vehicle, is not bolted to the tractor's cab floor, as would be typical. Instead, as shown in FIGS. 1 and 2, the base frame 18 is separated from and connected to the top frame 19 of the seat suspension 10 by the tapered coil spring set 20. Preferably, the tapered coil spring set includes four tapered coil springs, with a spring 60 positioned proximate to each of the distal ends of the base bars, and the spring connecting to the corresponding distal ends of the top bars.

Specifically, a first front spring 61 of the tapered coil spring set 20 mounts on the spring base 35 located proximate to the first base front distal end 31, and extends up to the spring cap 55 located proximate to the first top front distal end 51 of the top frame 19. A second front spring 62 of the tapered coil spring set mounts on the spring base located proximate to the second base front distal end 32, and extends up to the spring cap 55 located proximate to the second top front distal end 52 of the top frame. A first rear spring 63 of the tapered coil spring set mounts on the spring base located proximate to the first base rear distal end 33, and extends up to the spring cap 55 located proximate to the first top rear distal end 53 of the top frame. A second rear spring 64 of the tapered coil spring set mounts on the spring base located proximate to the second base rear distal end 34, and extends up to the spring cap 55 located proximate to the second top rear distal end 54 of the top frame. The tapered coil spring set interconnects the top frame 19 to the base frame 18 with a movable and dynamic connection.

Notably, the seat suspension system 10 of the present invention may be installed as a replacement to a conventional seat pedestal, which is used typically to raise the seat 12 of the tractor or work vehicle to a comfortable height. Preferably, as shown in FIG. 1, the base frame 18 of the seat suspension bolts onto the conventional seat mount 11 that extends from the cab floor of the work vehicle, so that the paired frame 17 replaces the conventional seat pedestal. Therefore, the height of the assembled seat suspension has roughly the same height of the conventional tractor seat and pedestal, which is approximately six inches. Most preferably, the pair of base bar connectors 26 are spaced to match any typical bolt pattern of the top of the seat pedestal or the mounting bolt pattern of the seat in the tractor or work vehicle, as needed or could be specified.

As discussed above, most preferably the base frame 18 is constructed of one-inch (outside diameter) square tubing, again preferably made of a high tensile steel. With the pair of base bar connectors 26 welded between the base front bar 21 and the base rear bar 22. The pair of base bar connectors are spaced apart so that mounting holes can be drilled in them to bolt the base frame to the seat mount 11 or alternatively the cab floor of the work vehicle, employing the existing seat pedestal mounting holes.

Additionally, as preferred, the base rear bar 22 with the top rear bar 42 can be offset from the base front bar 21 and the top front bar 41, as shown in FIGS. 1, 3, 6, and 7. A first base frame offset 71 can be included positioned proximate to the first base rear distal end 33 and a second base frame offset 72 can be included proximate to to second base rear distal end 34. Also a pair of top bar connector offsets 74 can be included in the pair of top bar connectors 46, as shown in FIG. 2. This configuration of offset is able to accommodate height differences typically of approximately three inches, from the rear to the front of a typical seat 12 employed in work vehicles, such as tractors.

With the top frame 19 of the paired frame 17 resting on the tapered coil spring set 20, vibration and bouncing motions felt by the operator are greatly reduced, as generated by the work vehicle or tractor with the seat mount 11, onto which the seat suspension 10 is mounted. For instance, in a tractor, vibrational motion is coming from many directions. The tapered coil spring set is ideal for absorbing these multidirectional movements and then self-centering back to their original position; essentially "self correcting" or "self centering." By engineered design, each tapered coil spring's vertical rebound energy is diminished because some of the rebound energy is directed horizontally, which further lessens the vibration making it ideal for dampening the seat suspension.

At present it is common practice to reduce vibration on machinery by using an "air ride" or "air lift" type of seat system suspension. However, while a conventional seat suspension helps to reduce vertical motion, it cannot decrease horizontal motion. The conventional air ride type of seat design lends to flexing up and down to reduce some vertical, bouncing types of rough ride vibrations, but not side to side, or front to back movements. Conventional seats actually add unwanted movement to motions and vibrations in most of the horizontal, or "side to side" and "forward and back" directions.

FIGS. 8 and 9 are graphs that show how the seat suspension 10 of the present invention is able to substantially reduce the vibrational motions in all three axises of motion in a tractor-mounted seat thereby isolating the seat from the vibrations of the tractor. Specifically, FIGS. 8 and 9 each chart the sum of acceleration movements in the X (side to side), Y (forward and backward), and Z (up and down) directions, as measured in "gravitational force equivalents" or "g's", over a time period of approximately 15 seconds. FIG. 8, titled TRAVEL ON A CROP LAND WITHOUT A SPRING ISOLATED SEAT, depicts the displacements of a standard, non-isolated tractor seat with the tractor traveling over a typical, rough crop-land surface at a low speed of approximately 10 mph.

FIG. 9, titled TRAVEL ON A CROP LAND WITH A SPRING ISOLATED SEAT, depicts the displacements of a tractor seat equipped with an embodiment of the seat suspension 10 of the present invention, also over the same, typical and rough crop-land surface, at a low speed of approximately 10 mph. Comparing FIG. 8 to FIG. 9, the substantial improvement in ride quality due to the vibrational dampening benefit from the seat suspension system 10 of the present invention is shown.

The vibrational dampening benefit from the seat suspension system 10 of the present invention is also exhibited on paved surfaces, especially for rubber belted tractors where typically the entire tractor vibrates as it travels at up to approximately 13 vibrational pulses per second, even at a speed as slow as 4 mph. A primary cause of this high vibration rate is the traction bars impacting the rubber belt, which runs under the drive sprocket of the tractor. Of note, when rubber belted tractors travel on pavement at slow speeds as low as 15 mph, the shaking can be so violent, the steering wheel columns can break their mounts and destroy the steering system mechanics of the tractor. Therefore, the seat suspension system of the present invention is of great benefit to better insulate or isolate the driver of the tractor from these potentially harmful and injurious vibrations, especially over the long term.

For the present specification, the terms "substantially", "proximate to", and "approximately" are employed herein throughout, including this detailed description and the attached claims, with the understanding that is denotes a level of exactitude or equivalence in amount or location commensurate with the skill and precision typical for the particular field of endeavor, as applicable. In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A vibration dampening seat suspension, the suspension comprising:

a paired frame with a base frame and a top frame, the base frame separated from the top frame by a tapered coil spring set, each spring of the tapered spring set having a spring top and a spring bottom, and the tapered coil spring set interconnect the top frame to the base frame;

the base frame including a base front bar and a base rear bar, and the base front bar connected to the base rear bar with a base bar connector;

the top frame including a top front bar and a top rear bar, and the top front bar connected to the top rear bar with a top bar connector;

the base front bar having a first base front distal end and a second base front distal end, and the base rear bar having a first base rear distal end, and a second base rear distal end, and a spring base mounted proximate to each of the first base front distal end, the second base front distal end, the first base rear distal end, and the second base rear distal end of the base frame, and each spring bottom of each of the tapered coil springs of the tapered coil spring set received onto and immovably mounted to each spring base;

the top front bar having a first top front distal end and a second top front distal end, and the top rear bar having a first top rear distal end and a second top rear distal end, and a spring cap mounted to each of the first top front distal end, the second top front distal end, the first top rear distal end and the second top rear distal end of the top frame, with each spring cap capping and holding in place the spring top of one spring of the tapered coil spring set;

each spring of the tapered coil spring set having a center, with each center surrounded by one spring of the tapered coil spring set and a central pipe received into the center of each spring of the tapered coil spring set, one central pipe attached to each spring cap and the central pipe extending from the top frame at the spring cap and downward through the center of each of the tapered coil springs of the tapered coil spring set, and each of the tapered coil springs held in place by the central pipe mounted to each spring cap beneath the top frame.

2. A vibration dampening seat suspension, the suspension comprising:

a paired frame having a base frame and a top frame, the base frame connected to the top frame with a tapered coil spring set having a multiple of springs, and each of the multiple of springs of the tapered spring set having a spring top and a spring bottom;

the base frame having a base front bar and a base rear bar, and the base front bar attached to the base rear bar;

the base front bar having a first base front distal end and a second base front distal end, and the base rear bar having a first base rear distal end, and a second base rear distal end, and a spring base mounted proximate to each of the first base front distal end, the second base front distal end, the first base rear distal end, and the second base rear distal end of the base frame, and each spring bottom of each of the tapered coil springs of the tapered coil spring set received onto and immovably mounted to each spring base;

the top frame including a top front bar and a top rear bar, and the top front bar attached to the top rear bar;

the top front bar having a first top front distal end and a second top front distal end, and the top rear bar having a first top rear distal end and a second top rear distal end, and each spring of the tapered coil spring set having a center, with each center surrounded by one spring of the tapered coil spring set; and a multiple of central pipes, with each of the multiple of central pipes received into each center of the tapered coil springs of the tapered coil spring set, one central pipe attached to each spring cap and the central pipe extending from the top frame and downward through the center of each of the tapered coil springs of the tapered coil spring set, and each tapered coil spring held in place by the central pipe mounted to the top frame.

3. The vibration dampening seat suspension of claim 2, additionally comprising:

a base bar connector attached between and connecting the base front bar to the base rear bar of the base frame.

4. The vibration dampening seat suspension of claim 2, additionally comprising:

a top bar connector attached between and connecting the top front bar to the top rear bar of the top frame.

5. The vibration dampening seat suspension of claim 2, additionally comprising:

a multiple of spring caps each of the multiple of spring caps mounted to each of the first top front distal end, the second top front distal end, the first top rear distal end and the second top rear distal end of the top frame, with each of the multiple of spring caps to cap and hold in place the spring top of one tapered coil spring of the tapered coil spring set; and one of the central pipes attached to each spring cap, with the central pipe extending from the top frame at the spring cap and downward through the center of each tapered coil spring of the tapered coil spring set, and each tapered coil spring held in place by the central pipe mounted to each spring cap beneath the top frame.

6. The vibration dampening seat suspension of claim 2, additionally comprising:

a spring cap mounted to each of the first top front distal end, the second top front distal end, the first top rear distal end and the second top rear distal end of the top frame, and with each tapered coil spring of the tapered coil spring set capped and held in place with the spring cap at the spring top.

7. The vibration dampening seat suspension of claim 6, wherein each of the central pipes attached to each spring cap at the spring top, with each of the central pipe extending from the top frame at the spring cap, downward through the center of each tapered coil spring of the tapered coil spring set, and each tapered coil spring held in place by the central pipe mounted beneath the top frame with the central pipe mounted to each spring cap.

\* \* \* \* \*